United States Patent Office 3,177,223
Patented Apr. 6, 1965

3,177,223
PREPARATION OF SUBSTITUTED IMIDAZOLES
William E. Erner, Wilmington, Del., assignor to Air Products and Chemicals, Inc., a corporation of Delaware
No Drawing. Filed Dec. 22, 1961, Ser. No. 161,427
4 Claims. (Cl. 260—309)

This invention relates to a method of preparing tri- and tetra-substituted imidazoles, particularly 2,4,5-trimethyl imidazole and 1,2,4,5-tetramethyl imidazole.

Certain polysubstituted imidazoles such as 2,4,5-trimethyl imidazole have exceedingly valuable activity as catalysts in polymerization reactions and such uses have been disclosed and claimed in copending applications, Serial Nos. 52,264 (now abandoned) and 52,053 (now U.S. Patent No. 3,152,094), both filed August 26, 1960, of which the present case is a continuation in part.

As disclosed in U.S. Patent No. 2,847,417, substituted imidazoles may be prepared by reaction of an organic acid with a selected alkylene diamine. For example, 2,4,5-trimethyl imidazole may be prepared by the reaction of acetic acid and 2,3-diamino-butane over a platinum catalyst. However, 2,3-diamino-butane required for the synthesis is not available commercially and the specific synthesis has not been explored so that neither conversions nor product yields are known. Similarly, the synthesis of tetramethyl imidazole has been reported [1] from methyl amine, diacetyl and acetaldehyde-ammonia ethanol solution. However, the high cost of diacetyl and the very poor yield obtained mark the process as unsatisfactory.

Accordingly, an object of the present invention is the synthesis of poly-substituted imidazoles by new and practical means.

Another object of the invention is the synthesis of poly-substituted imidazoles by catalytic alkylation of less highly substituted imidazoles and/or by isomerization of substituted imidazoles.

A further object of the invention is the synthesis of poly-substituted imidazoles from imidazoles having substituents on two of the nuclear carbon atoms, the synthesis being effected by a simple vapor phase catalytic alkylation in the N–1 position followed by catalytic isomerization of the N–1 substituent to the 4 or 5 postion, which may be followed by realkylaton of the N–1 position.

In accordance with one aspect of the present invention, mono- and di-substituted imidazoles having a free secondary amino-group, >N—H, are converted to the corresponding N-substituted imidazoles by reaction in vapor phase with an organic hydroxy compound, such as an alcohol having from 1 to 6 carbon atoms, over a solid dehydration catalyst at 700 to 800° F. More specifically, the method of alkylating mono- or di-substituted imidazole having a free secondary nitrogen atom involves a dehydration reaction between a $C_1$ to $C_6$ alkylating alcohol and an imidazole effected in vapor phase over an active solid dehydration catalyst, such as alumina, at 700–800° F. The alkylating alcohol is preferably used in excess, for example, in a molar ratio of 3/1 of the alcohol to imidazole.

Compounds representative of the substituted imidazole suitable for alkylation and their corresponding products with selected $C_1$–$C_6$ alcohols are:

| Imidazole | Alkylating Group | Product Imidazole |
|---|---|---|
| 2,4-dimethyl | Methyl | 1,2,4-trimethyl. |
| 2-methyl-4-ethyl | Methyl | 1,2-dimethyl-4-ethyl. |
| 2-ethyl-5-methyl | Ethyl | 1,2-diethyl-5-methyl. |
| 2-butyl-4-methyl | Methyl | 1,4-dimethyl-2-butyl. |
| 2,4-dimethyl | n-Hexyl | 1-n-hexyl-2,4-dimethyl. |
| 2,4-dimethyl | Benzyl | 1-benzyl-2,4-dimethyl. |

In accordance with another aspect of the invention, N–1 substituted imidazoles are catalytically isomerized by reaction in vapor phase over a solid catalyst having an active isomerization function at 900 to 1000° F.

More specifically, the catalytic isomerization of the invention is applicable to a poly-substituted imidazole represented by the generic formula:

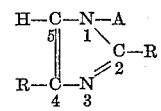

where R is an organic substituent on carbon; where A is a labile organic group isomerizable to an adjacent available (4 or 5) position—being either a short chain $C_1$ to $C_6$ aliphatic group, or an aralkyl group, such as benzyl; and where the substituted imidazole to be isomerized is volatilizable and essentially undecomposed under the conditions of isomerization. Representative substituted imidazoles isomerizable according to the invention and their isomerization products are:

| Charge | Product |
|---|---|
| 1,2,4-trimethyl imidazole | 2,4,5-trimethyl imidazole. |
| 1-methyl-2,4-diethyl imidazole | 2,4-diethyl-5-methyl imidazole. |
| 1,2-dimethyl-4-ethyl imidazole | 2,5-dimethyl-4-ethyl imidazole. |
| 1-ethyl-2,4-dimethyl imidazole | 2,4-dimethyl-5-ethyl imidazole. |
| 1-butyl-2,4-dimethyl imidazole | 2,4-dimethyl-5-butyl imidazole. |
| 1-benzyl-2,4-dimethyl imidazole | 2,4-dimethyl-5-benzyl imidazole. |
| 1,4-dimethyl-2-ethyl imidazole | 2-ethyl-4,5-dimethyl imidazole. |

The isomerization reaction is effected in vapor phase by passing the N-substituted imidazole together with a lesser amount of an inert hydrocarbon diluent, such as benzene, over a solid isomerization catalyst essentially at atmospheric pressure at space rates of from about 0.2 to 2.0 and generally in the temperature range of 900 to 1000° F. A preferred embodiment of this aspect of the invention involves the production of 2,4,5-trimethyl imidazole from 1,2,4-trimethyl imidazole effected in vapor phase at 940–960° F. and atmospheric pressure at a space rate (LHSV) of 1 on passing a mixture of approximately 1 volume of diluent benzene to 5 volumes of imidazole over activated alumina.

In accordance with a further aspect of the invention, the tri-C-substituted imidazole obtained by isomerization can be further alkylated by reaction with an organic hydroxy compound in vapor phase over a solid dehydration catalyst at 700 to 800° F. in the manner described above for substituted imidazoles having a free secondary amino-group, >N—H.

The significance of this series of syntheses is in the discovery of unexpected catalytic activity in the tri-C-substituted and per- or fully substituted imidazoles in polym- ---
[1] Lions et al.: J. Proc. Royal Soc. N.S.W. 74, 365–72 (1941), Chem. Abs. 35, 2890.8.

erization reactions, especially the high catalytic activity of 2,4,5-trimethyl imidazole and 1,2,4,5-tetramethyl imidazole in effecting the polymerization of di-isocyanates and polyols in forming polyisocyanates and polyurethanes.

The apparatus in which these reactions are conducted includes a vaporizer for feeding vapors of the feed materials into a reaction tube directing the vapors through a high temperature zone containing a bed of granular refractory oxide heated by external resistance heaters. The effluent from the high temprature zone is cooled by a condenser means. The apparatus was designed to operate at approximately atmospheric pressure, with sufficient positive pressure generated in the vaporization of the feed material to force the vapors through the reactor to the condenser, directing the liquid product into the receiving flask.

The nature of the invention is further clarified by the references to several examples.

*Example I*

2,4-dimethyl imidazole dissolved in methanol in a molar ratio of 1 to 3 was passed over alumina in vapor phase essentially at atmospheric pressure at 750–800° F. and at an hourly spaced rate (LHSV) of 1. The reactor effluent was stripped of methanol-water and further fractionated and crystallized to recover 1,2,4- and 1,2,5-trimethyl imidazole:

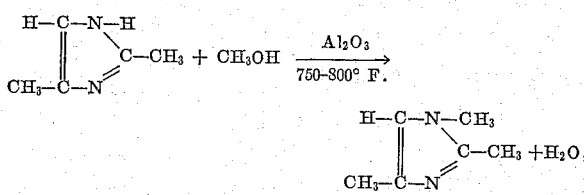

From 2200 g. of 2,4-dimethyl imidazole, about 1700 g. of 1,2,4- and 1,2,5-trimethyl imidazole were obtained by repeated crystallization and recycling the cuts boiling between 240–300° C. with fresh methanol. The product comprised the expected mixture of 1,2,4- and 1,2,5-trimethyl imidazoles boiling in the range of 200–240° C., principally in the range of 220–240° C.

The 2,4-dimethyl imidazole utilized in Example I may be made by various means described in the chemical literature. A preferred method is that described by Erner in U.S. No. 2,847,417 in which the synthesis of this compound is obtained in good yields from propylene diamine and acetic acid.

Conditions of operation, such as temperature and space rate are controlled to obtain conversions of the order of about 50% or more per pass. For example, liquid hourly space rates of 0.5 to about 2.0 and pressures from atmospheric to about 50 p.s.i.g. are used effectively in the temperature range specified with specific hydroxyl compounds to obtain desirable conversions.

The catalytic alkylation here described is not limited to dialkyl imidazoles such as the 2,4-dimethyl imidazole of Example I which is required for tri- and tetra-substituted imidazoles. The alkylation process is applicable to 2-methyl imidazole and imidazoles in general having a free >N—H group.

*Example II*

5450 grams of 2-methyl imidazole were dissolved in 5450 ml. of methanol (.852 g./cc.=4675 g.) and the solution passed over alumina at LHSV=1 and at 800° F. The product was fractionally distilled, yielding 1,2-dimethyl imidazole to 2-methyl imidazole in the ratio of 42/58. The bottoms were dissolved in fresh methanol and recycled to a final yield of 4675 g. of 1,2-dimethyl imidazole or about 10 lb.; 93.5% of theoretical yield.

*Example III*

1,2,4- and 1,2,5-trimethyl imidazole, as prepared according to Example I, were passed with 1 volume of benzene to 5 of imidazole in vapor phase over alumina at 940–960° F. at an LHSV of 1.

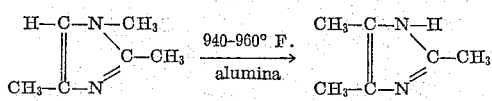

The reactor effluent was condensed and distilled with the lower boiling fraction (200–270° C.) recycled and the main cut (270–280° C.) taken as the desired product. An infra-red spectrum of the 270–280° C. material was identical with that of an authentic sample of 2,4,5-trimethyl imidazole prepared by the conventional synthesis.

The recovered product in the 270–280° C. boiling range obtained from successive runs made according to Example III were redistilled under a nitrogen atmosphere:

511 g. of crude distillate gave 304 g. of 2,4,5-trimethyl imidazole; boiling point 270–272° C.

35 g. of 240–270° C. boiling range, recycleable material 151 g. of 225–240° C. boiling range, recycleable material.

Fractionation of the crude product was effected under an inert gas atmosphere to protect the hot imidazole from oxidation. This gave a nearly colorless, clear product. The isomerization of trimethyl imidazole to eliminate the presence of isomers containing methyl substituted nitrogen was conducted in the same type of apparatus under conditions as previously described but employing as the catalyst a bed of granules of gamma alumina derived from alpha alumina trihydrate. A satisfactory yield of 2,4,5-trimethyl imidazole of satisfactory purity was obtained using this extremely mild isomerization catalyst. The space rate of 1 liquid volume of trimethyl imidazole per volume of catalyst per hour at a temperature of approximately 950° F. represents more severe conditions than employed in many isomerization reactions. Moreover, the quantity of gaseous by-products was advantageously low when the isomerization catalyst granules were sorptive alumina pellets derived from the alpha trihydrate of alumina.

In a series of runs using 1,2,4- and 1,2,5-trimethyl imidazole, as above, with ⅕ volume of benzene, several solid contact materials were investigated, including two commercial alumina cracking catalysts, synthetic silica alumina and quartz. Of these, the quartz at 925–940° F. was relatively unreactive, while the aluminas and silica-alumina gave satisfactory conversion with both fresh and recycle stocks.

Catalysts effective in the process of Example III are generally characterized as solid isomerization catalysts, within which classification are acidic solids such as alumina, silica-alumina, etc., particularly of the type familiarly used in catalytic cracking of hydrocarbons, in the form of granules, molded pellets or beads. Such catalysts include the synthetic dried gel-type catalyst formed from silica gel, or by co-precipitation of silica and alumina, or other known silica and/or alumina based materials, including acid-activated or impregnated clays of the montmorillonite and kaolin types. In the above described synthesis of 2,4,5-trimethyl imidazole, the method of effecting the shift of an N-substituent to the nuclear 4 (or 5) position by a vapor phase catalytic reaction, as shown in Example III, is not limited to the methyl group. Other stable alkyl substituents $C_2$ through $C_6$ are also catalytically isomerizable as are also simple stable and vaporizable aralkyl groups, such as benzyl.

*Example IV*

2,4,5-trimethyl imidazole and methanol are vaporized and passed over alumina in a ratio of 100 parts of the imidazole to 86 to 90 parts of methanol or a total of about 3 mols of methanol per mol of 2,4,5-trimethyl imidazole. Based upon the quantity of 2,4,5-trimethyl imidazole charged to the catalytic zone, the conversion was about 50% at an hourly liquid space rate of 1 at a temperature within the range from 740 to about 800° F. The reactor effluent was condensed to separate gaseous products and then fractionated to recover principally 1,2,4,5-tetramethyl imidazole, which melts at 58° C., boils at 125–128° C. at 29 mm. Hg pressure and forms salts with acids such as the yellow picrate which melts at 189° C. The result is, overall, a versatile process for synthesizing 2,4,5-trimethyl and 1,2,4,5-tetramethyl imidazole in practical commercial quantities at a heretofore unrealizable low cost.

The significance of this synthesis is based on the discovery that polysubstituted or per-substituted imidazoles and particularly short chain polyalkylated imidazoles, exhibit a catalytic activity at room temperature approaching or equaling that of the more active previously known tertiary amine catalysts and that these polyalkyl imidazoles show an activity at moderately elevated temperature exceeding that of any known tertiary amine catalyst used in polyurethane catalysis.

Various tests are known in the art for evaluating the activity of the catalysts in promoting polyurethane condensation. One such test involves reaction between polypropylene glycol of 2,000 molecular weight and tolylene diisocyanate in the presence of various catalysts at selected temperatures.

*Example V*

The ingredients used were:

150 g. polypropylene ether polyol, PPG 2000, 2000 mole wt.,
12 g.=10 ml. tolylene diisocyanate, TD 80
   80% 2,4-isomer
   20% 2,6-isomer and
0.15 g. catalyst.

The polyether polyol was placed in a Dewar flask with the catalyst dissolved therein at 25° C.; and 75° C. The tolylene diisocyanate was added and the mixture stirred. A Brookfield viscosimeter probe was inserted and the increase in viscosity noted with time. The time to attain viscosities of 125, 250, and 350 cps. with the polysubstituted imidazoles of the invention relative to imidazole, several reference alkyl imidazoles and diazabicyclooctane was taken as a measure "K" of catalytic activity.

From the time/viscosity data at the two temperatures, relative reaction rates were determined from the slopes of the curves at 25° C. and 75° C. Taking the rates for imidazole (K=1) as reference points, the comparative reaction rates for various catalysts are given in the table below:

| Catalyst | Relative Reactivity | |
|---|---|---|
| | K, 25° C. | K, 75° C. |
| Imidazole | 1.0 | 1.0 |
| 2,4-dimethyl imidazole | 1.1 | 2.5 |
| 2-ethyl-4-methyl imidazole | 1.1 | 1.7 |
| 2-methyl imidazole | 1.5 | 2.4 |
| 1,2-dimethyl imidazole | 5.5 | 3.2 |
| 2,4,5-trimethyl imidazole | 8.9 | 4.9 |
| 1,2,4,5-tetra methyl imidazole | 12.5 | 5.9 |
| Diazabicyclooctane | 12.5 | 4.3 |

It was surprisingly noted that, while the first methyl group substituted on a nuclear carbon of imidazole roughly doubled the catalytic activity (50% at 25° C. and 240% at 75° C.), the second methyl group on a nuclear carbon enhanced the activity but little over mono-alkylated imidazole at 75° C. and not at all at 25° C. However, polyalkylated imidazole having all of the nuclear carbons substituted had 5 to 9 fold greater activity than imidazole and a 2 to 6 fold greater activity than 2-methyl imidazole. Furthermore, 1,2,4,5-tetraalkyl imidazole at room temperature had an activity approximately equal to that of diazabicyclo-octane, which is the most active of the known and commercially utilized tertiary amine polyurethane catalysts. It was also shown that the tertiary per-alkyl imidazole at slightly elevated temperature had an activity exceeding that of diazabicyclooctane throughout the whole range of the test. 1,2-dialkyl imidazole, on the other hand, has an activity of less than half that of the tetra substituted compound at room temperature and approximately one half the activity of the tetra substituted imidazole at elevated temperature. With alkyl (preferably methyl) groups substituted on all the available positions as in 1,2,4,5-tetramethyl imidazole, catalytic activity was 6 to 12 fold that of imidazole; 2.5 to 8 fold that of 2 methyl imidazole. With alkyl substituents other than methyl the enhancement of catalytic activity is less than with methyl. However, alkyl substituents in the $C_1$ through $C_6$ range may be introduced while still generally retaining the catalytic activity of tri and tetra alkyl imidazoles.

Furthermore, the unique thermal sensitivity of the polyalkyl imidazoles as shown in the parent applications above identified, makes possible the use of imidazoles as polymerization catalysts such as trialkyl in combination with active co-catalysts which initiate the polymerization at low temperatures and thereby generate the heat necessary to fully activate trialkyl imidazole. Such co-catalyst combinations as:

1 part diazabicyclo-octane to 3 to 5 parts of 2,4,5-trimethyl imidazole
1 part stannous octoate to 2 to 3 parts of 2,4,5-trimethyl imidazole
1 part triethyl amine to 1 part of 2,4,5-trimethyl imidazole are effective.

*Example VI*

A catalyst solution was prepared by dissolving 30 g. of 1,2,4,5-tetramethyl imidazole, 90 g. of L520 organosilicone in 290 ml. of distilled water. Three hundred grams of LG-56 triol containing 0.3 g. of stannous octoate was blended with 104 g. of TDI-80 and with 12.3 g. of the catalyst solution with rapid mechanical mixing for seven seconds and quickly poured in a box mold. A creamy smoothly rising foam resulted which cured quickly. The foam had fine uniform structure of about 25 cells per linear inch and had a density of 2.1 lb. per cubic foot. Tensile strength ranged from 17.2 to 20.6 lb./in.$^2$. Tear strength ranged from 3.3 to 4.1 lb./inch. A compression set range of 7.2–8.4% based on original height after 22 hours compression of 90% at 70° C. was obtained after 48 hours curing at room temperature preceded by 2 hours curing at 145° C.

*Example VII*

Four g. of 1,2,4,5-tetramethyl imidazole and 0.5 g. of diazabicyclooctane were dissolved in 67 grams of N-phenyl-diethanolamine at 80° C. This solution was added to 500 g. of PPG 1000 at room temperature. After degassing in a rotary vacuum evaporator at 2 mm. Hg and 90–110° C. for 30 minutes, the mixture was quickly blended with 160 g. of TDI-80 and cast in a cylindrical mold. The mold was vacuum degassed for five seconds and placed in a 160° C. circulating air oven for 2½ hours to cure. The product casting was a rubbery urethane elastomer of slight yellowish color. Elastic limit was about 800%. Tensile strength was 540 lb./in.$^2$.

The catalytic activity of polyalkyl imidazoles in polymerization is evidenced further in reactions other than the urethane system, for example, in the polymerization of isocyanates.

*Example VIII*

When tolylene diisocyanate (TDI-80; 80% 2,4-, 20% 2,6-isomer) is mixed at room temperature with various catalysts and combinations of catalysts the resulting products range in properties from non-viscous essentially unchanged isocyanate monomer to viscous or hard polyisocyanate resins:

A. With 2.0 g. of 2,4,5-trimethyl imidazole per 100 parts of TDI, the mixture remains liquid after 1 hour at room temperature with little evident exotherm. However, on standing overnight, the mixture polymerizes to a thick, white (pasty) polymer.

B. With 1.0 g. of 2,4,5-trimethyl imidazole and 0.5 part of diazabicyclooctane (DABCO—Houdry) per 100 parts of TDI, the mixture starts to become cloudy in 15 minutes (attributed to dimer and/or trimer formation). Within 60 minutes a very viscous product forms accompanied by a mild exotherm to a maximum temperature of 68° C. at 30 minutes. On standing overnight the mixture polymerizes to a hard polyisocyanate resin.

C. With 1.0 g. of 2,4,5-trimethyl imidazole and 2.0 ml. (1.65 g.) of propylene oxide per 100 parts of TDI, the mixture shows essentially no change in viscosity within 60 minutes and through 180 minutes at room temperature the mixture remains liquid and non-viscous. A second preparation of this mixture is apparently unchanged when heated in a boiling water bath for 60 minutes. However, on standing at room temperature over 72 hours, the mixture solidifies to a very hard resin.

D. With 0.5 g. of diazabicyclo-octane per 100 parts of TDI the mixture shows an increase in viscosity in 30 minutes and becomes very viscous in 6 hours.

These exploratory polymerizations show that polyalkyl imidazoles, particularly 2,4,5-trimethyl imidazole, are effective catalysts in isocyanate polymerization, especially when used with catalysts active at low temperatures, such as diazabicyclo-octane, stannous octoate, or with catalyst activators such as the $C_2$–$C_4$ alkylene oxides.

While the above examples show the synthesis and use of 2,4,5-tri- and 1,2,4,5-tetramethyl imidazoles, the unique activity of polyalkylated imidazoles is not confined to the polymethyl compounds alone. Homologous polyalkyl imidazoles will have pronounced catalytic activity though not identical with that of 2,4,5-trimethyl-, 1,2,4,5-tetramethyl imidazole.

Thus, among the polysubstituted imidazoles the compounds preferred would have a total of ten carbons or less as alkyl or aralkyl substituents on the imidazole nucleus.

This application is a continuation in part of copending applications, Serial Numbers 52,053, which is now U.S. Patent No. 3,152,094, and 52,264, which is now abandoned.

Obviously many modifications and variations of the invention as hereinbefore set forth may be made without departing from the spirit and scope thereof, and thus only such limitation should be imposed as are indicated in the appended claims.

What is claimed is:
1. The method of synthesizing 2,4,5-trimethyl imidazole consisting in (a) alkylating 2,4-dimethyl imidazole by passing the imidazole together with about 3 moles of methanol per mole of imidazole over alumina at 700 to 800° F., (b) separating 1,2,4- and 1,2,5-trimethyl imidazole as the principal products thereof, (c) effecting the isomerization of said principal product from (b) to 2,4,5-trimethyl imidazole by passing said product over an acidic solid catalyst of the cracking catalyst type in vapor phase at 900 to 1000° F. together with a lesser amount of a hydrocarbon diluent, and (d) recovering said 2,4,5-trimethyl imidazole from the reaction effluent of (c).

2. The method of synthesizing 1,2,4,5-tetramethyl imidazole which includes the steps of:
(a) subjecting 2,4-dimethyl imidazole to reaction in vapor phase at 700 to 800° F. with a molecular excess of methanol in contact with alumina, and separating an isomeric mixture of 1,2,4- and 1,2,5-trimethyl imidazole as the principal product of said reaction;
(b) subjecting said isomeric mixture to reaction in vapor phase at 900 to 1000° F. together with a minor amount of an inert hydrocarbon diluent over solid isomerization catalyst comprising alumina, and recovering 2,4,5-trimethyl imidazole as product; and
(c) further subjecting said 2,4,5-trimethyl imidazole to realkylation in vapor phase at 700 to 800° F. with a molecular excess of methanol by contact with solid dehydration catalyst comprising alumina, thereby obtaining 1,2,4,5-tetramethyl imidazole.

3. The method of methylating 2,4-dimethyl imidazole which consists in reacting 2,4-dimethyl imidazole together with a molecular excess of methanol at 700 to 800° F. over alumina, and treating the reactor effluent to recover an isomeric mixture of 1,2,4- and 1,2,5-trimethyl imidazole.

4. The method of alkylating 2,4-dimethyl imidazole which consists in reacting 2,4-dimethyl imidazole together with a molecular excess of an alcohol selected from the group consisting of methanol, ethanol, benzyl alcohol and n-hexanol at 700 to 800° F. over alumina, and treating the reactor effluent to recover an isomeric mixture of 1-alkyl-2,4-dimethyl and 1-alkyl-2,5-dimethyl imidazole.

References Cited in the file of this patent
UNITED STATES PATENTS

| | | |
|---|---|---|
| 2,404,299 | Kyrides | July 16, 1946 |
| 2,830,037 | Carter | Apr. 8, 1958 |
| 2,843,568 | Benning et al. | July 15, 1958 |
| 2,847,417 | Erner | Aug. 12, 1958 |

OTHER REFERENCES

Schipper et al.: Imidazoles and Condensed Imidazoles in: Elderfield, Heterocyclic Compounds, volume 5, page 224, New York, Wiley, 1957.

Hill et al.: Ind. Eng. Chem., vol. 43, pp. 1579–83 (1951).

Hofmann: Imidazole and Its Derivatives, pp. 49–50, vol. 6 of the Chemistry of Heterocyclic Compounds, N.Y., Interscience, 1953.